(12) United States Patent  
Rouyre et al.

(10) Patent No.: US 10,358,204 B2
(45) Date of Patent: Jul. 23, 2019

(54) JOINT ASSEMBLY AND METHOD CONNECTING AN AIRCRAFT BELLY FAIRING TO THE FUSELAGE PROVIDED WITH A PARTICULARLY POSITIONED STRINGER

(71) Applicant: AIRBUS OPERATIONS (S.A.S.), Toulouse (FR)

(72) Inventors: François Rouyre, Cornebarrieu (FR); Christian Cros, Pibrac (FR); Jérome Antypas, Plaisance du Touch (FR); Sébastien Menard, Saint Paul sur Save (FR)

(73) Assignee: Airbus Operation (S.A.S.), Toulouse (FR)

( * ) Notice: Subject to any disclaimer, the term of this patent is extended or adjusted under 35 U.S.C. 154(b) by 691 days.

(21) Appl. No.: 14/980,515

(22) Filed: Dec. 28, 2015

(65) Prior Publication Data

US 2016/0185438 A1   Jun. 30, 2016

(30) Foreign Application Priority Data

Dec. 30, 2014   (FR) ..................................... 14 63448

(51) Int. Cl.
*B64C 1/06* (2006.01)
*B64C 7/00* (2006.01)
*B64C 3/26* (2006.01)

(52) U.S. Cl.
CPC .............. *B64C 1/069* (2013.01); *B64C 1/064* (2013.01); *B64C 3/26* (2013.01); *B64C 7/00* (2013.01)

(58) Field of Classification Search
CPC .............. B64C 1/069; B64C 7/00; B64C 3/26
See application file for complete search history.

(56) References Cited

U.S. PATENT DOCUMENTS

| 3,499,622 A | 3/1970 | Lugan et al. |
| 6,889,939 B2 | 5/2005 | Rouyre et al. |
| 8,177,167 B2* | 5/2012 | Meyer ...................... B64C 7/00 244/119 |
| 9,102,393 B2* | 8/2015 | Wilson .................... B64C 3/185 |
| 2003/0168554 A1 | 9/2003 | Rouyre et al. |

FOREIGN PATENT DOCUMENTS

| FR | 2 936 489 | 4/2010 |
| FR | 2 993 240 | 1/2014 |

OTHER PUBLICATIONS

French Search Report for Application No. 14 63448 dated Oct. 27, 2015.

* cited by examiner

*Primary Examiner* — Brian M O'Hara
(74) *Attorney, Agent, or Firm* — Jenkins, Wilson, Taylor & Hunt, P.A.

(57) ABSTRACT

A joint assembly in an aircraft connecting a belly fairing to the fuselage of the aircraft. The belly fairing has a sewing angle connected to a main belly fairing section, while the fuselage has a fuselage skin with an exterior and an interior. The joint assembly includes a sewing angle with a flange connected to the fuselage skin exterior at a fixation zone of the fuselage skin, with the fixation zone being overlapped by the flange where it is connected thereto. The joint assembly further includes a stringer connected to the fuselage skin interior and overlapping the fixation zone. This joint assembly is less susceptible to vibrations. The disclosure herein also pertains to a method of providing such a joint assembly.

12 Claims, 2 Drawing Sheets

JOINT ASSEMBLY AND METHOD CONNECTING AN AIRCRAFT BELLY FAIRING TO THE FUSELAGE PROVIDED WITH A PARTICULARLY POSITIONED STRINGER

CROSS-REFERENCE TO RELATED APPLICATION

This application claim priority to French Patent Application FR 14 63448 filed Dec. 30, 2014, the entire disclosure of which is incorporated by reference herein.

TECHNICAL FIELD

The disclosure herein relates to a joint assembly in an aircraft connecting a belly fairing to the aircraft fuselage, and an aircraft provided with such a joint assembly. The disclosure herein also pertains to a method of providing a joint assembly between an aircraft belly fairing and the aircraft fuselage.

BACKGROUND

Fairings generally have two primary purposes. They serve to conceal and protect, and equally to make the local area less susceptible to relative fluid flow, i.e. more aerodynamic or hydrodynamic. They frequently are provided covering mechanical parts, and gaps between mechanical parts, so as to make a respective area flush with its surroundings.

Efficient fairing design reduces the relative aerodynamic or hydrodynamic force, notably drag, experienced by a vehicle or structure and can therefore potentially save cost. For a vehicle, fairings serve to reduce the drag experienced by the vehicle when in motion, which in turn enables it to travel faster and reduces fuel consumption. For vehicles such as aircraft which are exposed to extremely high-speed relative fluid flow, this translates to a significant saving in operational cost.

In present day aircraft, one of the regions furnished with a fairing is the belly. The belly is generally the underside of the fuselage of the aircraft. Sometimes, this region may be somewhat distinct and pronounced from the fuselage, especially at the section between the wings.

By way of example, FIG. 1 is a perspective schematic representation of an aircraft 1 intended to give the general context of the disclosure herein. It shows a belly fairing 2 on an aircraft and one which is somewhat distinct to the fuselage 3 as is found on some of the more modern aircraft in existence today. The belly fairing 2 depicted here is primarily a large unit of complex shape.

The belly of an aircraft is host to a plethora of systems and components essential to the functioning and comforts of a modern-day airliner. Undercarriages including landing gears, wheels, shock absorbers, air conditioning units, battery packs, hydraulics and piping may be provided in this region, so as to intrude as little as possible into the fuselage space. So as to conceal and protect the belly region and to render the aircraft more aerodynamic, a belly fairing is provided.

Aircraft belly fairing sections nowadays come in large units. Despite serving to reduce drag significantly, these fairings nevertheless experience drag when exposed to a flowing fluid or when moving through a fluid. This sometimes results in undesired vibrations at various regions of the fairings. Such vibrations may weaken the joint assembly securing the belly fairing to the fuselage and may cause damage to the fairings.

SUMMARY

Therefore, there is a need for a joint assembly connecting a belly fairing to the aircraft fuselage which can further reduce or eliminate undesired vibrations. To that end, the disclosure herein has, as one of its objectives, to remedy at least partially the aforementioned disadvantages of the prior art.

The present disclosure provides a joint assembly in an aircraft connecting a belly fairing to the fuselage of the aircraft, the fuselage having a fuselage skin with a fuselage skin exterior and a fuselage skin interior, the joint assembly comprising:
  a portion of the belly fairing defining a flange connected to the fuselage skin exterior; and
  a fixation zone of the fuselage skin, to which the flange of the belly fairing is connected, the fixation zone being overlapped by the flange;
  wherein the joint assembly further comprises:
  a stringer connected to the fuselage skin interior and located such that it overlaps the fixation zone, and
  wherein the portion of the belly fairing defining the flange is a sewing angle, the sewing angle being connected to a main belly fairing section of the belly fairing.

This novel arrangement for the junction between a belly fairing and the fuselage, and of connecting a stringer to the fuselage skin interior on the opposite side, and at the same level, to where a sewing angle of the belly fairing is connected significantly stiffens the joint assembly and therefore has an improved capability to dampen vibrations at the joint area, particularly low frequency vibration. It has been found to significantly impede the existence and development of low frequency vibrational modes in the vicinity of the joint assembly.

The joint assembly can furthermore comprise one or several of the following features taken individually or according to any technically permissible combination.

Preferably, the stringer is an Omega stringer.

More preferably, a substantial portion, in particular the most part, of a flange of the stringer overlaps the fixation zone.

Preferably, a plurality of stringers provided which overlap the fixation zone.

More preferably, the stringers provided overlap the fixation zone principally at the main cross-section of the aircraft.

Advantageously, the flange of the sewing angle is substantially parallel to the fuselage skin exterior at the fixation zone.

Preferably, a sealant is provided between the flange of the sewing angle and the fuselage skin exterior.

Preferably, the sealant is additionally provided such that it overlaps a portion of fuselage skin which is also overlapped by a closed-section formed by the stringer connected to the fuselage skin interior.

Preferably, a shim is interposed between the sewing angle and the main belly fairing section, the shim having an elastomer seal on one side and a PTFE-based coating on the other side.

Desirably, the main belly fairing section, the sewing angle and the stringer(s) are made of the same material, and in particular of composites.

Advantageously, an aircraft is provided with such a joint assembly.

The present disclosure also provides a method of providing a joint assembly between a belly fairing of an aircraft and the fuselage of the aircraft, the fuselage having a fuselage skin with a fuselage skin exterior and a fuselage skin interior, the method comprising:
providing a portion of the belly fairing defining a flange;
providing a fixation zone of the fuselage skin, to which the flange of the belly fairing is to be connected;
connecting the flange to the fuselage skin exterior at the fixation zone of the fuselage skin such that the fixation zone is overlapped by the flange;
wherein the method further comprises:
providing a stringer;
connecting the stringer to the fuselage skin interior such that it overlaps the fixation zone; and
providing a sewing angle as the portion of the belly fairing which defines the flange, which sewing angle is connected to a main belly fairing section of the belly fairing.

BRIEF DESCRIPTION OF THE DRAWINGS

The disclosure herein will be better understood from reading the following detailed description and non-limiting examples, as well as studying the figures, wherein.

In all of these figures, identical references can designate identical or similar elements.

In addition, the various portions shown in the figures are not necessarily shown according to a uniform scale, in order to make the figures more legible.

DETAILED DESCRIPTION

Figure 1:
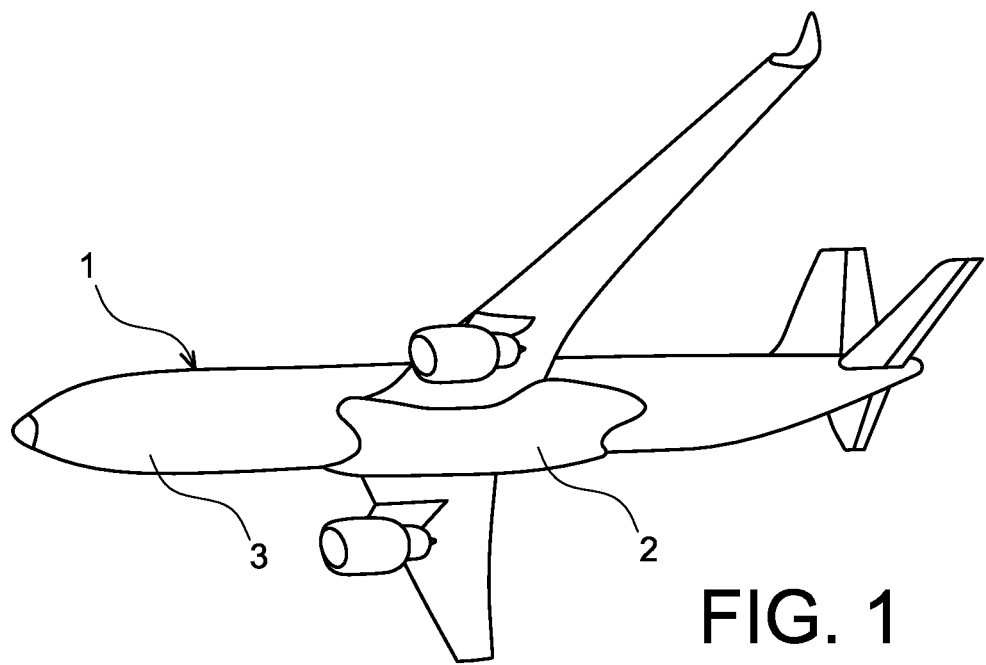
FIG. 1 shows a schematic representation in perspective from below and to the side of an aircraft having a belly fairing to give the context of the disclosure herein.

FIG. 1 has already been described in connection with the context of the disclosure herein and prior art.

It is further to be noted that the hereafter described particular embodiments of the disclosure herein may be discussed in relation with an aircraft such as that of FIG. 1. Therefore, reference numerals of FIG. 1 are also used afterwards when describing the aircraft.

Now, a preferred embodiment of the disclosure herein will be discussed.

Figure 2:
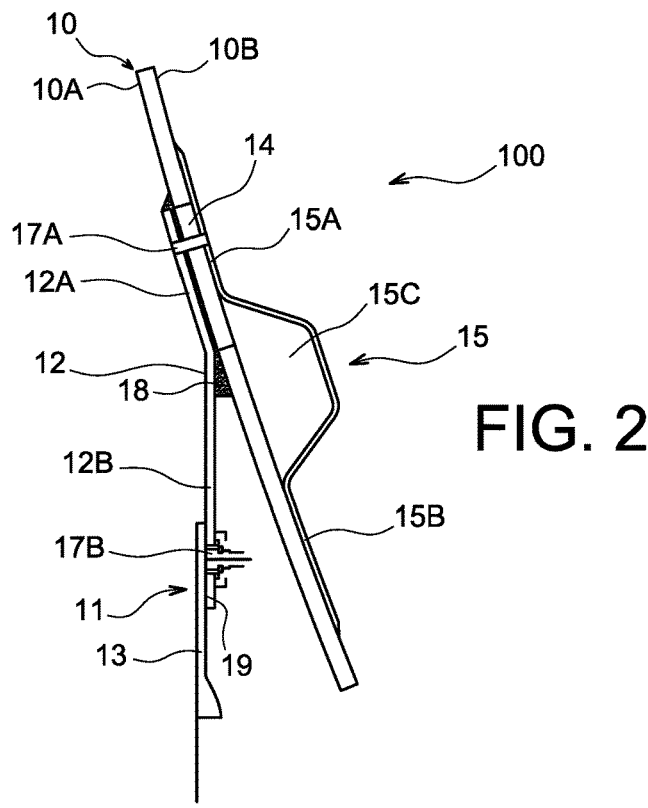
FIG. 2 shows a cross-section view of a belly fairing to fuselage joint assembly according to a first embodiment of the disclosure herein.

FIG. 2 depicts a cross-section view of the belly fairing to aircraft fuselage joint assembly 100 which enables vibrations to be significantly attenuated.

A fuselage skin 10 is shown extending diagonally across the figure. The aircraft fuselage skin 10 is a typical section of a fuselage skin 10 made of composites. The fuselage skin 10 has a fuselage skin exterior 10A and a fuselage skin interior 10B, using a standard reference corresponding to when the aircraft will be in use.

The term 'fuselage skin exterior' refers to the outer surface of the fuselage skin 10, while the term 'fuselage skin interior' refers to the inner surface of the fuselage skin 10 (and not the interior of the fuselage skin body itself). As depicted here, the fuselage skin exterior 10A and interior 10B are found, naturally, on opposite sides of the fuselage skin 10.

On one side of the fuselage skin 10, and attached thereto is the belly fairing 11. The belly fairing 11 is portrayed as a two-part fairing having a main belly fairing section 13 which is relatively large and makes up most of the belly fairing 11, and a sewing angle 12 which makes up a smaller portion of the fairing 11 and facilitates attachment of the main belly fairing section 13 to the fuselage 3 (see FIG. 1).

The main belly fairing section 13 may be realised as one or two large units which essentially covers the entire belly region of the aircraft 1. Making the main belly fairing section 13 as a single unit allows for a stronger fairing, while reducing part-count and simplifying assembly. The main belly fairing section 13 in this embodiment is made of composites. The main belly fairing section 13 essentially encloses numerous systems and components within the belly region of the aircraft, such as the air-conditioning systems, undercarriages, hydraulics, battery packs, hydraulics and piping.

A sewing angle 12 is located at the upper end of the belly fairing 11, as can be seen from FIG. 2. The main belly fairing section 13 is thus coupled with the sewing angle 12 for its attachment to the fuselage. The sewing angle 12 extends all around the belly fairing 11.

The sewing angle 12 has two sections: a flange 12A and a connection portion 12B which are at an angle to each other. The connection portion 12B is substantially parallel to the main belly fairing section 13 where it is attached thereto, and this is so along the length of the sewing angle (i.e. in the direction extending into and out of the plane of FIG. 2). The connection portion 12B in this embodiment is screwed (reference 17B) to the large belly fairing section so as to be secured thereto. Meanwhile, the flange 12A is presented to the fuselage 3 for connection thereto. The angle provided in the sewing angle 12 permits a continuous transition between the plane of the fuselage 3 and the plane of the belly fairing 11 at the local area. Particularly, it avoids a joint assembly being formed at exactly where the plane of the fuselage 3 intersects the plane of the fairing 13, and permits overlapping joints to be formed spaced slightly away from the intersection and thus provides a more robust structure.

The sewing angle 12 therefore not only serves an aerodynamic function as part of the fairing 11, but also provides a structural function in that it connects the main belly fairing section 13 to the fuselage 3. This two-part belly fairing arrangement 11 allows for the main belly fairing section 13 to be made as a single large unit of unitary construction, and therefore can speed-up assembly. For practical manufacturing purposes, the sewing angle 12 is furnished in long but discrete lengths, ideally formed of the same material as that of the main belly fairing section 13, i.e. composites in this case.

The flange 12A of the sewing angle is attached to the fuselage skin exterior 10A at a fixation zone 14 of the fuselage skin 10. The 'fixation zone' is substantially the part of the fuselage skin 10 which is overlapped by the sewing angle flange 12A at the point where it is attached to it. Considering that the thickness of the aircraft fuselage skin 10 is very small compared to its overall length and breadth, the fixation zone 14 will be understood to be the region of the fuselage skin 10 which is of area essentially equivalent to the overlapped area, and which traverses the entire thickness of the fuselage skin 10 in a direction normal to the fuselage skin 10.

For the avoidance of doubt, in this context, an 'overlap' is defined as the area of the fuselage skin 10 which is covered by an object connected thereto when viewed from the fuselage skin 10 in a direction normal to it at the local area of connection. Therefore, the fixation zone 14 is the region of the fuselage skin 10 overlapped by the sewing angle flange 12A at the point where it is attached to it when viewed substantially normally from the fuselage skin 10 at the point of attachment and which traverses the entire thickness of the fuselage skin 10 in a direction normal to the fuselage skin 10.

The flange 12A of the sewing angle 12 is bolted (reference 17A) to the fixation zone 14 of the fuselage skin 10 so as to secure the sewing angle 12 to the fuselage 3.

On other side of the fuselage skin 10, and attached thereto at the level of the fixation zone 14 is an Omega stringer 15. 'Omega stringer' is to be understood as an Omega-section stringer, i.e. a stringer having a cross-section which somewhat resembles the Greek alphabet omega, Ω. The Omega stringer 15 is located such that it overlaps the fixation zone 14 of the fuselage skin 10, which as mentioned earlier, is the region of the fuselage overlapped by the sewing angle flange 12A.

An omega stringer 15 is used as it has been found to bestow the best stiffness properties to the joint assembly 100. In particular, the closed-section 15C that it forms when connected to the fuselage skin 10 provides excellent bending/buckling, torsional and compression-tension stiffness, especially when considering its weight. In that regard, any stringer having a closed section, or ideally forming a closed-section when attached to the fuselage skin interior, will be advantageous and can be employed. Furthermore, the stringer shown in the figure has two flanges 15A, 15B which serve to engage a wide area of the fuselage skin 10. The two flanges 15A, 15B of the Omega stringer 15 are provided such that they are substantially parallel to the surface of the fuselage skin 10. The stringer 15 entirely overlaps the fixation zone 14 when viewed from the fuselage skin 10 in a direction normal to it, with one of its flanges 15A provided such that it overlaps most of the fixation zone 14. The flange 15A also overlaps a part of the fuselage skin which is not within the fixation zone. Meanwhile, the closed-section 15C formed by the stringer 15 is seen to overlap the remainder of the fixation zone 14, and also a part of the fuselage skin which is outside the fixation zone. Of course, other embodiments where only the flange of the stringer overlaps the fixation zone, and even then only partially overlaps the fixation zone, may be realised. Equally, a stringer may be provided such that its closed-section entirely overlaps the fixation zone in the local area. The bolts 17A which secure the sewing angle flange 12A to the fixation zone 14 also secure the stringer 15, so as to clamp the whole assembly together.

This results in the local area of the joint assembly 100 being reinforced, having improved stiffness characteristics in terms of bending and torsion, especially when considered in three dimensions (3D). The joint assembly 100 thus possesses an increased Eigen frequency, which in turn diminishes the risk of high-cycle structural damage to that part. Advantageously, it reduces low frequency local vibration modes, which are amongst the main causes of structural damage in the belly fairing to fuselage junction. The increased the Eigen frequency of the local area additionally helps to prevent aero-structural coupling. In other words it moves the modes of vibration of the structure outside the range of the typical aerodynamic excitation which will be experienced at the local area, thereby preventing resonance.

A plurality of stringers 15 may be furnished at various locations along the entire length of the fixation zone 14, i.e. along the periphery of the belly fairing 11. Sometimes however, due to the double curvature nature of the fixation zone 14 (see FIG. 1, in particular the double curvature of the extremity), a stringer 15 cannot be positioned at the level of the junction of the belly fairing. Consequently, it is envisaged that stringers 15 will be provided overlapping the fixation zone 14 principally at the region between the wings, i.e. at the main cross-section of the aircraft. The stringer 15 will ideally made of the same material as that of the belly fairing 11 and the fuselage skin 10, so of composites too.

The referenced prior art does not teach, or suggest this particular joint assembly for the belly fairing to fuselage connection. This concept of furnishing a stringer connected to and overlapping the fixation zone helps to reduce local low frequencies vibrations phenomena and high-cycles structural damage.

Figure 3:
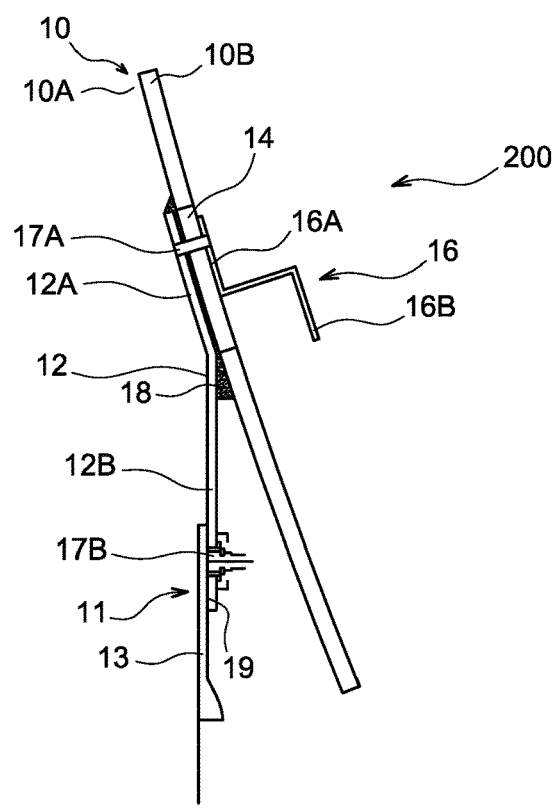
FIG. 3 shows a cross-section view of a belly fairing to fuselage joint assembly according to a second embodiment of the disclosure herein.

FIG. 3 illustrates another embodiment of the joint assembly 200 of the current disclosure herein. This time, instead of an omega stringer, a stringer 16 of a different profile is employed, namely a Z-section stringer. This stringer 16 has two flanges 16A, 16B, with the entire flange 16A being located such that it overlaps the fixation zone 14. This is an open-section stringer 16 which, like-for-like, is not as stiff as compared to the closed-section Omega stringer 15, especially with regard to torsional resistance and bending/buckling stiffness. However, each stringer 15, 16 possesses its own physical properties, with material, size, length, and profile all contributing towards it overall properties. It will be appreciated that the choice of stringer additionally depend on numerous parameters correlating to the specific aircraft too, such as overall design and stiffness of the aircraft and its cruise velocity. Accordingly, a stringer with a first profile may be more effective in one scenario, and a stringer with a second profile more effective in an another scenario. E-section, R-section, and Π-section are other examples of stringer profiles which are believed to be suitable. A stringer having a variable profile can also be employed, as can a combination of stringers with different profiles.

In the embodiments discussed above, various other aspects have been provided to further dampen vibrations and reduce the transmission thereof. For example, a sealant 18 is furnished between sewing angles flange 12A and the composite fuselage skin 10. This sealant 18 is thinly applied between the two surfaces, prior to them being connected. This sealant 18 is an elastomeric-type substance suited to absorbing structural and aerodynamic excitations. Located between the sewing angles flange 12A and the composite fuselage skin 10, it naturally overlaps the fixation zone. In FIG. 2, it overlaps a part of the fixation zone 14 which is overlapped by the flange 15A of the stringer 15 and by the closed-section 15C formed by the stringer 15. Some of the sealant 18 may be provided such that overlaps a portion of the fuselage skin 10 which is outside the fixation zone 14.

A bead of the sealant 18 is provided such that it covers the otherwise exposed edge of the sewing angle 12 at the region of the joint assembly 100. The bead serves to smoothen the transition from the fuselage skin exterior 10A to the sewing angle 12 outer surface, so as to avoid disrupting the airflow and to protect the sewing angle edge from erosion effects. At the opposite end, another bead of sealant 18 is provided between the connection portion 12B of the sewing angle 12 and the fuselage skin exterior 10A. In FIG. 2, this overlaps a portion of the fuselage skin which is outside the fixation zone 14, but which is overlapped by the Omega stringer 15, in particular the closed-section 15C formed by the stringer 15. The bead helps to reduce the transmission of vibrations and contributes towards the integrity of the joint assembly 100.

Another feature to assist in reducing the transmission of vibrations is the shim 19 interposed between the main belly fairing section 13 and the sewing angle 12 at the location of the screw 17B. The shim 19 has an elastomer seal surface at the side which is engaging the main belly fairing section 13 and a polytetrafluoroethylene PTFE-based surface, e.g. Teflon®, on the reverse side engaging the sewing angle flange 12A. The provision of this shim 18 permits both a sliding and cushioning effect at the joint assembly 100, serving to absorb vibrations and reduce the transmission thereof. Ideally, sealant 18 and shims 19 will be provided all around the periphery of the belly fairing 11, so as to maximise the dampening of structural and aerodynamic excitations.

It should be noted that the aircraft belly fairing to fuselage joint assembly will also be applicable to aircraft other than aeroplanes, e.g. helicopters. While composites has been discussed in the above embodiments as the material of choice for the fuselage skin, the belly fairing and the stringer, other materials or a combination of materials will equally be applicable. For example, aluminium or titanium may be used. Similarly for the fasteners, other types of suitable fasteners may be employed apart from bolts and screws. For example, in certain scenarios, the use of rivets or bonding may be more applicable.

It should be noted that terms 'connected' and 'overlap' do not necessarily mean that the respective parts are physically touching each other. For example, a sealant or shim may be interposed. Furthermore, 'overlap' does not necessarily mean completely overlapped.

Junction has been used to describe the general area where the joint assembly is located. The joint assembly is a specific part of the junction, essential for the connection between two parts. It should be noted that although the belly fairing is primarily intended to conceal the belly region of the aircraft, the belly fairing may also extends to nearby regions, for example, just above the wing root.

The embodiments described above are exemplary and are not to be construed as limiting. It will be appreciated that other embodiments or improvements to the disclosure herein will be apparent to the skilled person within the scope of the claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A joint assembly in an aircraft connecting a belly fairing to a fuselage of the aircraft, the fuselage having a fuselage skin with a fuselage skin exterior and a fuselage skin interior, the joint assembly comprising:
   a sewing angle, comprising:
      a flange connected to the fuselage skin exterior; and
      a fairing connection portion disposed at an angle to the flange;
   a fixation zone of the fuselage skin defined by a periphery of the belly fairing, to which the flange of the sewing angle is connected, wherein the fixation zone is overlapped by the flange; and
   a stringer connected to the fuselage skin interior and located such that the stringer overlaps at least a portion of the fixation zone,
   wherein the fairing connection portion of the sewing angle extends around the periphery of the belly fairing and connects the belly fairing to the fuselage in an overlapping joint.

2. The joint assembly according to claim 1, wherein the stringer is an Omega stringer.

3. The joint assembly according to claim 1, wherein a substantial and majority portion of a flange of the stringer overlaps the fixation zone.

4. The joint assembly according to claim 1, wherein a plurality of stringers are provided which overlap the fixation zone.

5. The joint assembly according to claim 4, wherein the plurality of stringers overlap the fixation zone principally at a main cross-section of the aircraft.

6. The joint assembly according to claim 1, wherein the flange of the sewing angle is substantially parallel to the fuselage skin exterior at the fixation zone, and the fairing connection portion of the sewing angle is substantially parallel to the belly fairing.

7. The joint assembly according to claim 1, wherein a sealant is provided between the flange of the sewing angle and the fuselage skin exterior.

8. The joint assembly according to claim 7, wherein the sealant overlaps a portion of fuselage skin which is also overlapped by a closed-section formed by the stringer connected to the fuselage skin interior.

9. The joint assembly according to claim 1, wherein a shim is interposed between the sewing angle and the belly fairing, the shim having an elastomer seal on one side and a PTFE-based coating on the other side.

10. The joint assembly according to claim 1, wherein the belly fairing, the sewing angle, and the stringer is made of a same composite material.

11. An aircraft comprising a joint assembly connecting a belly fairing to a fuselage of the aircraft, the fuselage having a fuselage skin with a fuselage skin exterior and a fuselage skin interior, the joint assembly comprising:
   a sewing angle, comprising:
      a flange connected to the fuselage skin exterior; and
      a fairing connection portion disposed at an angle to the flange;
   a fixation zone of the fuselage skin defined by a periphery of the belly fairing, to which the flange of the sewing angle is connected, wherein the fixation zone is overlapped by the flange; and
   a stringer connected to the fuselage skin interior and located such that the stringer overlaps the fixation zone,
   wherein the fairing connection portion of the sewing angle extends around the periphery of the belly fairing and connects the belly fairing to the fuselage in an overlapping joint.

12. A method of providing a joint assembly between a belly fairing of an aircraft and a fuselage of the aircraft, the fuselage having a fuselage skin with a fuselage skin exterior and a fuselage skin interior, the method comprising:
   providing a sewing angle comprising a flange portion and a fairing connection portion that are disposed at an angle to one another;

providing a fixation zone of the fuselage skin defined by a periphery of the belly fairing;

connecting the flange portion to the fuselage skin exterior at the fixation zone such that the fixation zone is overlapped by the flange portion;

connecting a stringer to the fuselage skin interior such that the stringer overlaps the fixation zone; and connecting the fairing connection portion to the belly fairing in an overlapping joint along the periphery of the belly fairing.

\* \* \* \* \*